(12) United States Patent
Orman et al.

(10) Patent No.: US 11,959,825 B2
(45) Date of Patent: Apr. 16, 2024

(54) METHOD AND A CONDITION MONITORING DEVICE FOR MONITORING A ROTATING EQUIPMENT

(71) Applicant: ABB Schweiz AG, Baden (CH)

(72) Inventors: Maciej Orman, Malopolskie (PL); Manuel Oriol, Zurich (CH); Pallavi Hujband, Bengaluru (IN); Prasad Venikar, Sangli (IN); Tejas Atul Trivedi, Vasai (IN); Neethu T. Pradeep, Kochi (IN)

(73) Assignee: ABB Schweiz AG, Baden (CH)

( * ) Notice: Subject to any disclaimer, the term of this patent is extended or adjusted under 35 U.S.C. 154(b) by 58 days.

(21) Appl. No.: 17/615,318

(22) PCT Filed: May 26, 2020

(86) PCT No.: PCT/IB2020/054955
§ 371 (c)(1),
(2) Date: Nov. 30, 2021

(87) PCT Pub. No.: WO2020/240404
PCT Pub. Date: Dec. 3, 2020

(65) Prior Publication Data
US 2022/0221375 A1     Jul. 14, 2022

(30) Foreign Application Priority Data
May 31, 2019    (IN) .............................. 201941021810

(51) Int. Cl.
*G01M 13/028*     (2019.01)
*G01H 1/00*     (2006.01)

(52) U.S. Cl.
CPC .......... *G01M 13/028* (2013.01); *G01H 1/003* (2013.01)

(58) Field of Classification Search
CPC .... G01M 13/028; G01M 13/045; G01M 7/00; G01H 1/003; G01R 33/02
See application file for complete search history.

(56) References Cited

U.S. PATENT DOCUMENTS

| | | | |
|---|---|---|---|
| 6,370,957 B1 * | 4/2002 | Filippenko | G01H 1/003 73/659 |
| 11,002,634 B2 * | 5/2021 | Fayfield | G01M 13/045 |

(Continued)

OTHER PUBLICATIONS

European Patent Office, International Search Report in International Patent Application No. PCT/IB2020/054955, 3 pp. (dated Aug. 20, 2020).

(Continued)

*Primary Examiner* — John E Breene
*Assistant Examiner* — Yaritza H Perez Bermudez
(74) *Attorney, Agent, or Firm* — Leydig, Voit & Mayer, Ltd.

(57) ABSTRACT

A method for monitoring a rotating equipment through a condition monitoring device is performed in every predetermined time period after every predetermined time interval. The method comprises detecting presence of vibration in rotating equipment based on a signal associated with vibration in the rotating equipment. The signal is measured with one or more sensors of the plurality of sensors. Upon detecting presence of vibration, a predefined number of samples associated with the vibration is acquired at a first frequency. A Root Mean Square (RMS) value of vibration is calculated using predefined number of samples. The calculated RMS value of vibration is compared with a reference value for detecting an operating status, which is stored for every predetermined time interval. Thereafter, the method comprises processing the stored information to assess a condition of the rotating equipment.

10 Claims, 4 Drawing Sheets

(56) References Cited

U.S. PATENT DOCUMENTS

2002/0108444 A1\* 8/2002 Matsuoka .............. G01H 1/003
 73/593
2019/0064034 A1\* 2/2019 Fayfield ............. G05B 23/0289

OTHER PUBLICATIONS

European Patent Office, Written Opinion in International Patent Application No. PCT/IB2020/054955, 6 pp. (dated Aug. 20, 2020).

\* cited by examiner

METHOD AND A CONDITION MONITORING DEVICE FOR MONITORING A ROTATING EQUIPMENT

CROSS-REFERENCE TO RELATED APPLICATIONS

This patent application is a U.S. national phase patent application of International Patent Application No. PCT/IB2020/054955, filed May 26, 2020, which claims priority from Indian Patent Application No. 201941021810, filed May 31, 2019, each of which is fully incorporated herein by reference for all purposes.

TECHNICAL FIELD

The present disclosure relates in general to condition monitoring of rotating equipment. More particularly, the present disclosure relates to a method and a condition monitoring device for monitoring a rotating equipment.

BACKGROUND

Rotating equipment such as, motors, generators, pumps and the like are highly important in industrial applications. The rotating equipment are affected by environmental, mechanical, and other issues, most of which can be rectified. Due to these issues, condition monitoring of the rotating equipment has become an important factor in industries. The condition monitoring of rotating equipment is a process of monitoring parameters of a particular condition in the rotating equipment (such as, vibration, temperature etc.), in order to identify a significant change which is indicative of a developing fault. The use of condition monitoring allows maintenance to be scheduled, or other actions to be taken to prevent consequential damages and avoid its consequences.

Nowadays, in almost every applications, rotating equipment such as, motors are used. The motors are differentiated based on multiple factors, one being an operating time of the motors. The operating time of motors differ based on duty cycle. For instance, some of the motors run continuously, while some motors may run in a time period.

Multiple parameters of the motors are monitored during the condition monitoring. One of the parameters being the start and stop status of the motors. Typically, for the motors which runs continuously, determination of exact start and stop time might be of less importance. Currently, the running condition of the motor is determined for hourly basis. Thus, the start and stop events for the motors is recorded with a resolution of approximately an hour. This resolution may be well suited for continuous duty motors. However, for the motors having intermittent duty cycle, it may be required to monitor the running condition more frequently. The intermittent duty cycle is cycle of operation occurring on an interval basis. Thus, detecting the start and stop events of the rotating equipment with a lesser resolution period is desired.

SUMMARY

An aspect of the present disclosure relates to a method of monitoring a rotating equipment using a condition monitoring device. The condition monitoring device comprises a plurality of sensors for measuring one or more parameters associated with the rotating equipment and a processor for processing data measured using the plurality of sensors. The method is performed at every predetermined time period and after every predetermined time interval.

The method comprises detecting presence of vibration in the rotating equipment based on a signal associated with vibration in the rotating equipment. The signal is measured with one or more sensors of the plurality of sensors and corresponds to a measurement location of the one or more sensors based on a placement of the condition monitoring device relative to the rotating equipment. Upon detecting the presence of vibration in the rotating equipment, the method comprises acquiring a predefined number of samples associated with the vibration at a first frequency. The predetermined number of samples are acquired using the one or more sensors. The predefined number of the samples are utilised for calculating a Root Mean Square (RMS) value of vibration. Further, the method includes comparing the calculated RMS value of vibration with a reference value for detecting an operating status of the rotating equipment. The reference value is calculated from data measured by the plurality of sensors at beginning of the predetermined time period.

Particularly, the reference value is calculated based on vibration data measured at the beginning of each predetermined time period. In an embodiment, the rotating equipment receives power at a variable frequency which is used in calculation of the reference value at the beginning of each predetermined time period. In an embodiment, the operating status of the rotating equipment comprises information on one or more start of the rotating equipment and one or more stop of the rotating equipment at the plurality of predetermined time interval. In an embodiment, if the RMS value is greater than the reference value, the operating status of the rotating equipment is detected as start. Further, the method includes storing the operating status of the rotating equipment detected for every predetermined time interval. Thereafter, the method comprises processing information stored for each of the predetermined time intervals in the predetermined time period, to assess a condition of the rotating equipment. In an embodiment, the condition of the rotating equipment is determined based on the processed information associated with the plurality of predetermined time interval and the processed information associated with the predetermined time period.

In an implementation, the present disclosure may relate to a condition monitoring device for monitoring a rotating equipment. The condition monitoring device comprises a plurality of sensors configured to measure data associated with the rotating equipment. At every predetermined time interval, one or more sensor of the plurality of sensors is configured to generate a signal associated with vibration at a measurement location relative to the rotating equipment and acquire a predefined number of samples associated with the vibration at a first frequency. Further, the condition monitoring device comprises a network interface configured to communicate with a server and a processor. The processor performs one or more operations in the predetermined time period, after every predetermined time interval. Particularly, the processor detects presence of vibration in the rotating equipment based on the signal generated by the one or more sensors. Upon detecting the vibration based on the signal, the processor calculates a Root Mean Square (RMS) value of vibration using the predefined number of samples received from the one or more sensors. Further, the processor compares the calculated RMS value with a reference value for detecting an operating status of the rotating equipment. The reference value is calculated based on the data measured by the plurality of sensors at beginning of the predetermined time period. The operating status detected for every predetermined time interval is stored in a memory. The memory is communicatively coupled to the processor.

Thereafter, the processor processes information stored for every predetermined time intervals in the predetermined time period, to assess a condition of the rotating equipment.

The processor may optionally comprise providing data measured by each of the plurality of sensors to the server using the network interface. Further, receiving the information for assessing the condition of the rotating equipment. The information is processed at the server based on the provided data.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

DETAILED DESCRIPTION

Embodiments of the present disclosure relate to a method and a condition monitoring device for monitoring a rotating equipment. In an embodiment, the rotating equipment may be one of motors, generators, pumps and the like, used in an industrial environment. The method is performed using a condition monitoring device associated with the rotating equipment. The condition monitoring device may be affixed to the rotating equipment in order to monitor the rotating equipment. Particularly, the condition monitoring device may detect an operating status of the rotating equipment based on the monitoring in order to access a condition of the rotating equipment.

Figure 1:
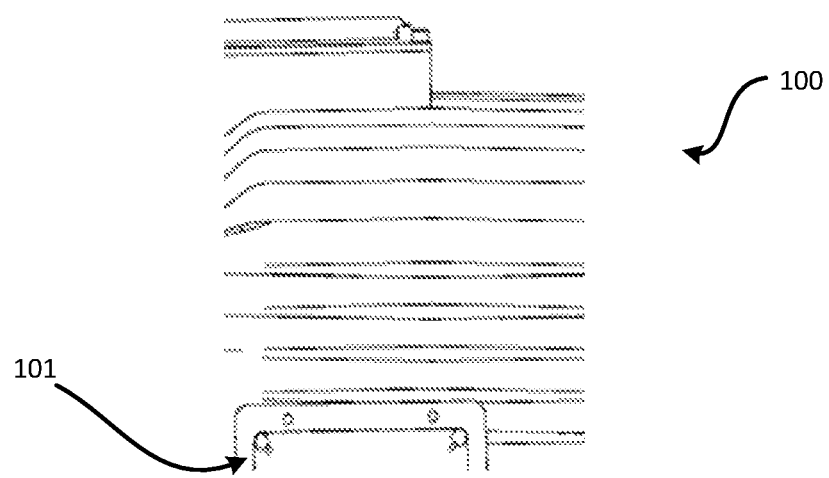
FIG. 1 is illustrative of a motor schematic including a condition monitoring device in accordance with an embodiment of the present disclosure.

Reference is now made to FIG. 1 showing a schematic diagram of a motor 100. The motor 100 may be any motor operating with an intermittent duty cycle. In an embodiment, the intermittent duty cycle may be defined as an operation period which occurs on an interval basis, for example, duty cycle of one hour. As shown in FIG. 1, the motor 100 is affixed with a condition monitoring device 101. The condition monitoring device 101 may monitor the motor 100 to access a condition of the motor 100. Particularly, the condition monitoring device 101 may monitor the motor 100 for every predetermined time period for detecting an operating status of the motor 100. For instance, the predetermined time period may be one hour. The monitoring may be performed after every predetermined time interval in the predetermined time period. For example, the predetermined time interval may be 2.5 minutes. Thus, in this case, the monitoring may be performed after every 2.5 minutes in the one-hour time period. The monitoring and processing data at the rotating equipment in predetermined time interval may save memory space and lead to power conservation in the condition monitoring device 101. The operating status of the motor 100 may include information on start of the motor 100 and stop of the 100 at the predetermined time interval. The operating status may be detected for a plurality of predetermined time interval. For example, the operating status may include information if the motor 100 is at start position or at stop position at every predetermined time interval. The information associated with the operating status may be processed to access a condition of the motor 100.

Figure 2:
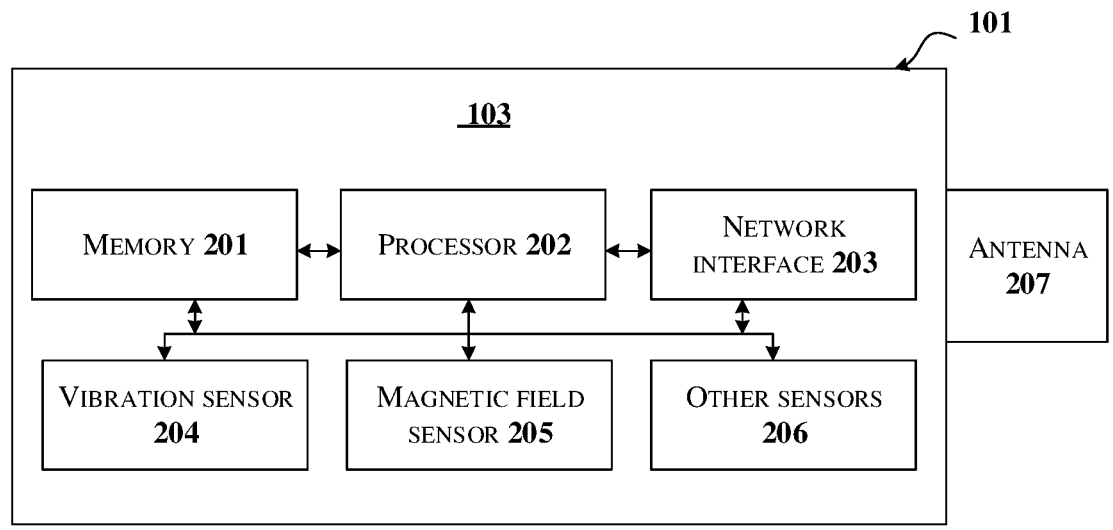
FIG. 2 shows a functional block diagram of the condition monitoring device, in accordance with an embodiment of the present disclosure.

FIG. 2 shows a functional block diagram of the condition monitoring device, in accordance with an embodiment of the present disclosure.

A simplified representation of a condition monitoring device 101 is shown in FIG. 2. The condition monitoring device 101 comprises a housing body 103 capable of being affixed to a body or shell or frame of the rotating equipment such as, the motor 100 (as shown in FIG. 1). The housing body 103 houses a plurality of sensors including, but not limited to, a vibration sensor 204, a magnetic field sensor 205 and other sensors 206. The vibration sensor 204, the magnetic field sensor 205 are collectively represented as one or more sensors throughout the present disclosure. The one or more sensors record and transmit measured signal. The one or more sensors may perform the measurement according to the placement of the condition monitoring device 101 relative to the rotating equipment.

Further, the condition monitoring device 101 includes a memory 201 for storing data. The data may include data measured by the one or more sensors while monitoring the rotating equipment. The data may include a reference value which is used for detecting the operating status of the rotating equipment. Further, the data includes the operating status calculated for the rotating equipment for the plurality of predetermined time interval.

In an embodiment, the vibration sensor 204 such as an accelerometer may be used to measure vibrations in the rotating equipment. The vibration sensor 204 is used for measuring the vibration of the rotating equipment after every predetermined time interval, which then is used by the condition monitoring device 101 for detecting the operating status of the rotating equipment. The vibration sensor 204, i.e., for example, the accelerometer is configured to perform or measure vibration data after every predetermined time interval. For example, the accelerometer may be in "wake up on vibration mode". The vibration sensor 204 may be associated with a timer which may be configured for measuring the data after every predetermined time interval.

In an embodiment, the magnetic field sensor 205 or a magnetometer may be used to measure the magnetic flux around the rotating equipment, such as the motor 100. The magnetic field sensor 205 is a transducer which converts magnetic field strength to electrical signals. The magnetic flux measured is used to calculate line frequency of the rotating equipment. At the beginning of each predetermined time period, data from the vibration sensor 204 and the magnetic field sensor 205 are measured for calculating the reference value of RMS value of vibration.

Figure 3:
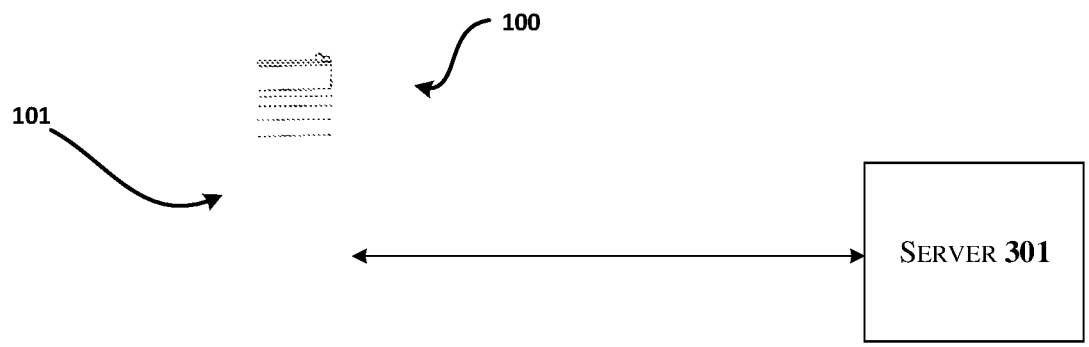
FIG. 3 illustrates an exemplary embodiment for a condition monitoring device communicating with a server for monitoring a rotating equipment, in accordance with an embodiment of the present disclosure.

Additionally, the condition monitoring device 101 may include a network interface 203 configured for communication with an external entity. In one embodiment, the network interface 203 is capable of communicating over wireless media such as Bluetooth, Wireless HART, and the like. The network interface 203 may communicate with the external entity using an antenna 207 as shown in FIG. 2. In another embodiment, the network interface 203 may be configured to facilitate communication between the processor 202 and the external entity. The external entity may include a server and the like. FIG. 3 illustrates an exemplary embodiment for a condition monitoring device communicating with a server for monitoring a rotating equipment, in accordance with an embodiment of the present disclosure. In an embodiment, as shown in FIG. 3, the condition monitoring device 101 associated with the rotating device, the motor 100, is connected with a sever 301. In such a scenario, according to relative placements, the one or more sensors may measure data and send the measurements to the processor 202, which may communicate raw data through the network interface 203 to the server 301 for processing. The condition monitoring device 101 receives processed information from the server 301 for assessing the condition of the motor 100.

Further, the condition monitoring device 101 also includes a processor 202 configured to receive measurements from the one or more sensors and detects the operating status of the rotating equipment. The processor 202 is configured to monitor and detect the operating status of the rotating equipment periodically at every predetermined time period. After every predetermined time interval in the predetermined time period, the processor 202 receives a signal associated with vibration from the vibration sensor 204 to detect a presence of vibration in the rotating equipment.

For example, vibration in the motor 100 may be detected by the vibration sensor 204 such as the accelerometer, which may signal the processor 202 for collecting data. The signal corresponds to a measurement location of the vibration sensor 204 based on the placement of the condition monitoring device 101 relative to the rotating equipment. In case the vibration is detected, the processor 202 acquires a predefined number of samples of vibration from the vibration sensor 204 at a first frequency. In an example, the predefined number of samples may be sixty-four samples and the first frequency may be two Kilohertz. The predefined number of samples of vibration is acquired for calculating the Root Mean Square (RMS) value of vibration for the rotating equipment.

A person skilled in the art would understand that any predefined number of samples may be acquired for determining the RMS value of vibration in the present invention. In an embodiment, the RMS value of the vibration is calculated by any known techniques. Further, the processor is configured to compare the RMS value of vibration with the reference value to detect the operating status of the rotating equipment at the predetermined time interval. In an embodiment, the processor 202 calculates the reference value at the beginning of the predetermined time period based on the data measured by the plurality of sensors. The rotating equipment is detected to be in start state, if the RMS value of vibration is determined to be greater than the reference value. Likewise, the rotating equipment is detected to be in stop state, if the RMS value of vibration is determined to be lesser than the reference value. The operating status detected for every predetermined time interval in the predetermined time period is processed in order to assess the condition of the rotating equipment.

Figure 4:
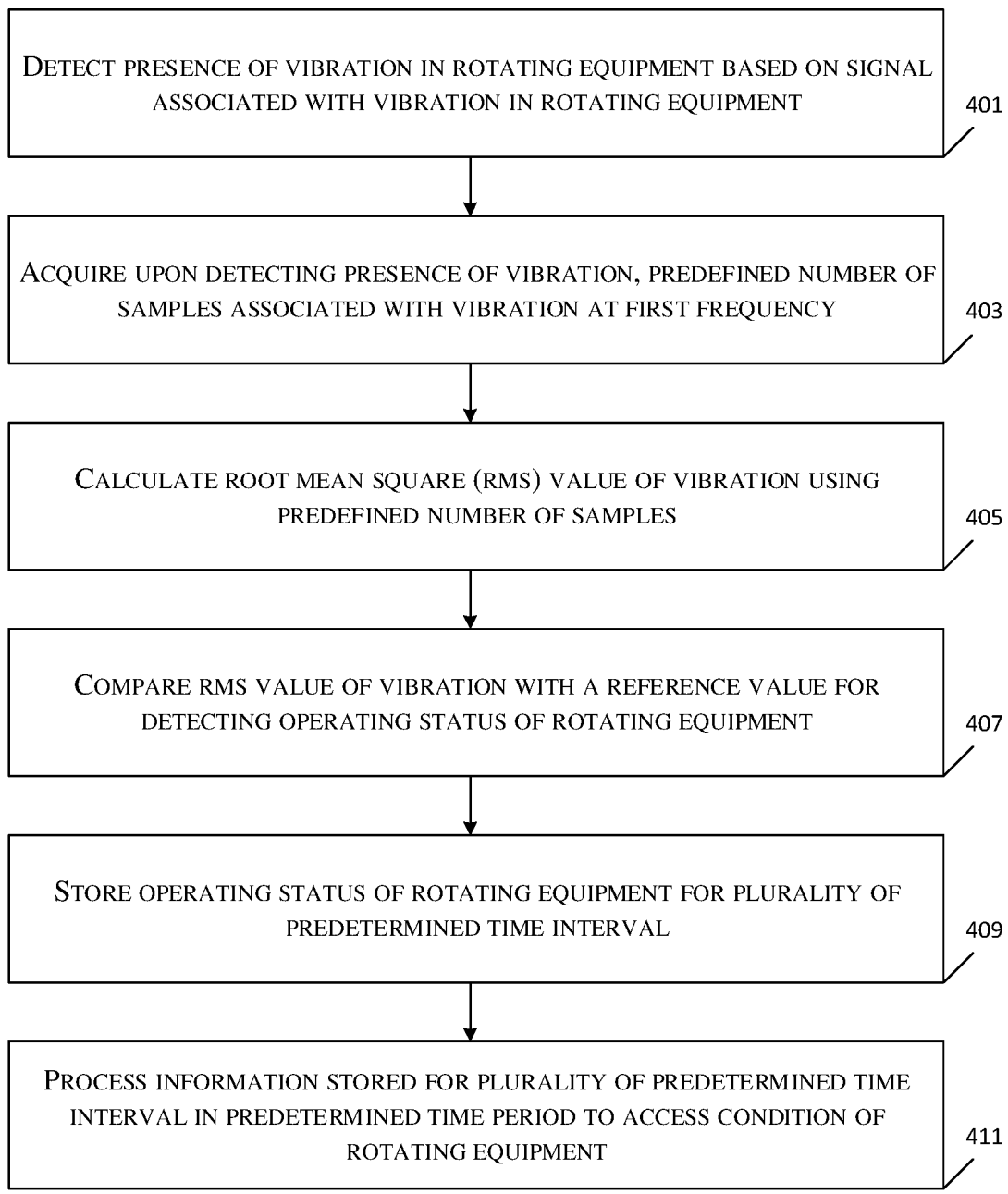
FIG. 4 shows a flowchart of a method for monitoring a rotating equipment in accordance with an embodiment of the present disclosure.

FIG. 4 shows a flowchart of a method for monitoring a rotating equipment in accordance with an embodiment of the present disclosure.

FIG. 4 illustrates a flowchart of the method for monitoring the rotating equipment in accordance with an embodiment of the invention. The rotating equipment may be typically present in an industrial environment, for example, a process plant and the like.

The rotating equipment such as the motor 100 is associated with the condition monitoring device 101. The condition monitoring device 101 is installed/affixed on the rotating equipment for monitoring. The condition monitoring device 101 detect the operating status of the rotating equipment at every predetermined time interval, which is used for assessing the condition of the rotating equipment.

At the beginning of every predetermined time period of the rotating equipment, such as the motor 100, the condition monitoring device 101 determines the reference value of vibration based on the data measured by the plurality of sensors. In an embodiment, the rotating equipment receives power at a variable frequency which is used in calculation of the reference value. Accordingly, the reference value is updated at every predetermined time period.

The condition monitoring device 101 receives a number of samples, for example, 1024 samples, measured by the vibration sensor 204 at a predefined frequency, for example, 2 khz, to determine a kurtosis and velocity RMS. Measurements from the plurality of sensors may be used for calculating speed and the line frequency of the rotating equipment. In an embodiment, the speed and the line frequency of the rotating equipment can be determined using any known techniques. Further, the condition monitoring device 101 receive a number of samples measured by the magnetic field sensor 205 at a predefined frequency, for instance, 300 Hz, to determine a frequency spectrum. In one embodiment, the number of samples may be collected from a multi-axial magnetic field sensor. The RMS value measured is compared against a threshold value of vibration to detect if the rotating equipment is in start/stop state. Particularly, the rotating equipment is detected to be in start state, if the RMS value measured is greater than the threshold value of vibration. In case, the rotating equipment is detected to be in start state, the reference value is updated with the RMS value. The reference value is stored in the memory 201. Subsequently, after the predetermined time interval, for example, after two and half minutes, the condition monitoring device 101 may receive the data from the one or more sensors.

At block 401, the method includes detecting presence of the vibration in the rotating equipment based on the signal associated with vibration. In an embodiment, the vibration sensor 204 may wait for a specific time, for example say two seconds, for detecting the presence of the vibration. In case the vibration is not detected in the specific time, the condition monitoring device 101 may check if the rotating equipment is switched "ON" and perform the detection of the vibration a predefined number of times. The detection of the vibration is initiated after every predetermined time interval. In an embodiment, the condition monitoring device 101 may set a timer for every predetermined time interval for the one or more sensors. Specifically, the vibration sensor 204 is configured to measure the signal which corresponds to the measurement location of the vibration sensor based on the placement of the condition monitoring device 101 relative to the rotating equipment. In an embodiment, the measurement location is the location where the condition monitoring device 101 is mounted on the rotating equipment. More specifically, the location is the location of the one or more sensors within the housing body 103 of the condition monitoring device 101 when the condition monitoring device 101 is affixed on the rotating equipment. In an embodiment, the condition monitoring device 101 may be positioned differently for measurements. In an embodiment, if no vibration is detected in the rotating equipment, the condition monitoring device 101 detect the rotating equipment to be at stop state and the timer is set for next predetermined time interval.

At block 403, once the presence of vibration is detected in the rotating equipment, the method includes acquiring the predefined number of samples associated with the vibration from the vibration sensor 204. The predefined number of samples are acquired at the first frequency. In an example, the predefined number of samples may include sixty-four sample, one twenty-eight samples and the like. A person skilled in the art would understand that the number of samples may be configurable in the present disclosure. In an example, the first frequency may be two kilohertz. A person skilled in the art would understand that the first frequency for collecting the predefined number of samples may be based on the rotating equipment and configurable in the present disclosure. In an embodiment, the predefined number of samples associated with the vibration includes acceleration values of the rotating equipment during vibration.

At block 405, the method includes calculating the RMS value of vibration based on the predefined number of samples. In an embodiment, the RMS value is defined as square root of the average of the squared values of waveform. In an embodiment, the RMS value of vibration may be calculated by any known existing techniques.

At block 407, the method includes comparing the calculated RMS value of vibration with the reference value calculated for the predetermined time period. Particularly, the reference value for vibration may change over time, if the rotating equipment is operated at variable frequency. Thus, the reference value is calculated at each predetermined time period in order to improve accuracy of detection operating status of the rotating equipment.

Based on the comparison, the operating status of the rotating equipment is detected. In an embodiment, the operating status of the rotating equipment includes information on one or more start of the motor and one or more stop of the rotating equipment at each predetermined time interval of the predetermined time period. For instance, if the calculated RMS value is determined to be greater than the reference value, the operating status is detected to be as start state. In an embodiment, in order to determine the start of the rotating equipment, the amplitude of the RMS value may increase rapidly when the rotating equipment starts running such signal character is easy to be detected. The detection of start of the rotating equipment is implemented based on the reference value. When the amplitude of RMS value is larger than the reference value, it is considered that the rotating equipment is started.

In a similar manner, detection of stop of the rotating equipment can be performed. In an embodiment, the amplitude of the RMS value may decrease when the rotating equipment stops running same as in the case of the rotating equipment start, such signal character is obvious and easy to be detected. The detection of the rotating equipment stop is also implemented based on the reference value. When the amplitude of the RMS value is smaller than the reference value, it is considered that rotating equipment is stopped.

Figure 5:
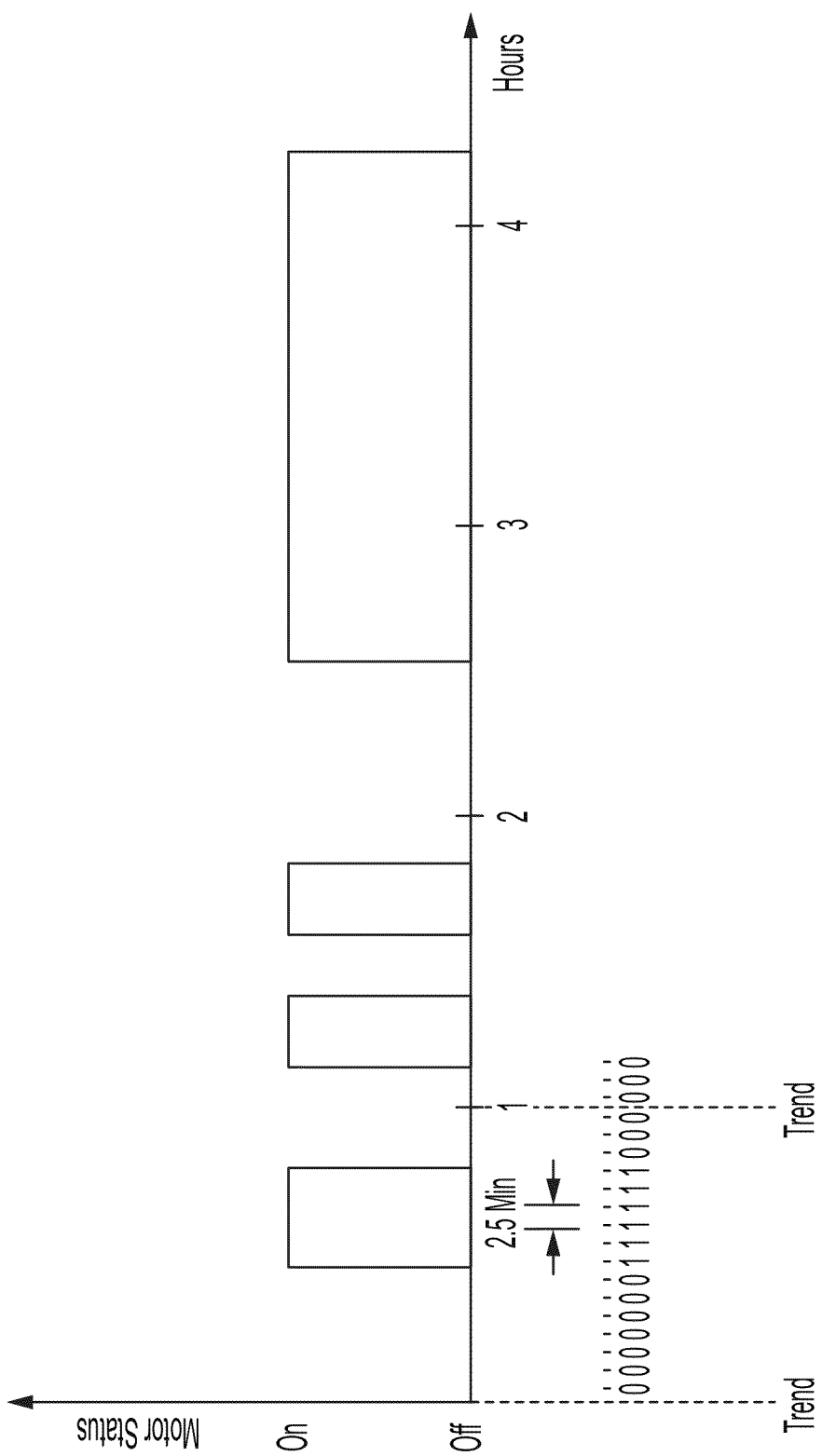
FIG. 5 illustrates an exemplary graph representing operating status of a rotating equipment device in accordance with an embodiment of the present disclosure.

At block 409, the method includes storing the operating status detected for the rotating equipment in the memory 201 for every predetermined time interval. FIG. 5 illustrates an exemplary graph representing operating status of a rotating equipment device in accordance with an embodiment of the present disclosure. FIG. 5 illustrates a graph of recording the operating status of a motor. In the present case, the graph is recorded for the motor with the predetermined time period of one hour and the predetermined time interval of two and half minutes. Thus, the operating status at every 2.5 minute is detected by the condition monitoring device 101 and stored as a bit information in a 24-bit format, where one bit corresponds to 2.5 minutes. Thus, if the motor is at start, the value of the bit will be "one" otherwise, it will be zero. Thus, the minimum interval with which the start/stop can be detected is 2.5 minutes. Therefore, at the end of every predetermined time interval, the bit values may be taken into account to determine the operating status. Consider, for example, if a user sets the predetermined time period as 30 minutes. In such case, 12 bits may be used to determine the operating status of the motor. Additionally, if the user sets the predetermined time period greater than 1 hour, then the 24 bits may be modified to fill the interval. For example, if the predetermined time period is 2 hours, then the 24 bits information may be recorded at every 5 minutes. In an embodiment, the condition monitoring device 101 may count the predetermined time interval by adding a counter at every predefined time, for example, ten seconds. For example, if the predetermined time period is one hour, the predetermined time interval of 2.5 minutes is counted by the counter which is reset once it reaches a value of fifteen. (15*10=150 sec=2.5 minutes).

At block 411, the method includes processing the information stored for each of the predetermined time intervals in the predetermined time period to assess the condition of the rotating equipment. In an embodiment, information may also include one or more starts and one or more stops of the rotating equipment over the predetermined time period. Such information may include times of start/stop, number of starts/stops over a predetermined time period, loading related information and the like. The information is processed after every predetermined time period for assessing the condition of the rotating equipment. The condition of the rotating equipment is assessed based on the processed information associated with every predetermined time interval and the processed information associated with the predetermined time period.

In an embodiment, the processed information associated with every predetermined time interval and with the predetermined time period may be used by the server 301 to assess the condition of the rotating equipment. The condition may be associated with health status and also a condition requiring maintenance and/or other support. For example, the condition monitoring device 101 may have a simple life estimation model (e.g. empirical mathematical relations), which takes start/stop/change for estimating remnant life and predicting a condition requiring maintenance. An example of a simple life estimation model can empirically represent life as a curve relating count of number of starts specified for values of mean (average) load on the rotating equipment and the condition monitoring device 101 may use an mathematical expression relation representing the curve to estimate/predict a time or condition for maintenance based on the value of number of starts. Similarly, the condition monitoring device 101 can also incorporate mean time period between a start and stop signals of the rotating equipment along with the mean load values to determine a condition for maintenance.

Further, the method optionally includes receiving the information for assessing the condition of the rotating equipment, from the server 301 over the network interface 203 of the condition monitoring device 101. Particularly, the server 301 in communication with the condition monitoring device 101, receives the data measured by each of the plurality of sensors, which is processed to assess the condition of the rotating equipment. For example, the server 301 may have one or several models to process the data related to individual/several sensors of the condition monitoring device 101. The processing of data from the plurality of sensors may be used to determine the condition of the rotating equipment. For instance, consider a case, where a motors at a specific site may experience failure after a certain number of starts/stops. An analysis module at the server 301 may use this information and correlate to detect the condition of the motor 100. Further, the server 301 transmits the processed information to the condition monitoring device 101.

Thus, a condition monitoring device 101 can assess conditions warranting service, maintenance or maintenance planning. This can be done based on information already available with the device during configuration, and information collected through its sensors/received from the server 301. The condition monitoring device 101 can also send the raw data and/or processed data of the rotating equipment to the server 301. At the server 301, the information from the condition monitoring device 101 can also be gathered which may be utilized for various condition assessment and/or maintenance planning activities.

The present invention provides various advantages. The information associated with operating status such as, the start, the stop, can serve as input for one or several life estimation models at the condition monitoring device 101 (and/or life estimation model(s) at the server). The condition monitoring device 101 utilizes the information associated with start, stop for predicting a condition requiring maintenance and/or other support. A communication to trigger an action (e.g. schedule a maintenance etc.) may be sent (e.g. through communication by server, through communication by condition monitoring device etc.) based on the processed information.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

| REFERRAL NUMERALS | |
|---|---|
| Reference Number | Description |
| 100 | Motor |
| 101 | Condition monitoring device |
| 103 | Housing body |
| 201 | Memory |
| 202 | Processor |
| 203 | Network interface |
| 204 | Vibration sensor |
| 205 | Magnetic field sensor |
| 206 | Other sensors |
| 207 | Antenna |
| 301 | Server |

We claim:

1. A method of monitoring a rotating equipment with a condition monitoring device, wherein the condition monitoring device comprises a plurality of sensors for monitoring one or more parameters associated with the rotating equipment, the method comprising:
performing in every predetermined time period, after every predetermined time interval:
- a. detecting presence of vibration in the rotating equipment based on a signal associated with vibration in the rotating equipment, wherein the signal is measured with one or more sensors of the plurality of sensors and corresponds to a measurement location of the one or more sensors based on a placement of the condition monitoring device relative to the rotating equipment;
- b. acquiring upon detecting the presence of vibration in the rotating equipment, a predefined number of samples associated with the vibration at a first frequency, wherein the predetermined number of samples are acquired using the one or more sensors;
- c. calculating a Root Mean Square (RMS) value of vibration using the predefined number of samples;
- d. comparing the calculated RMS value of vibration with a reference value, for detecting an operating status of the rotating equipment, wherein the reference value is calculated from data measured with the plurality of sensors at a beginning of every predetermined time period and is based on vibration data measured at the beginning of every predetermined time period;
- e. storing the operating status of the rotating equipment for a plurality of predetermined time interval based on the comparison; and
- f. processing information stored for the plurality of predetermined time intervals in the predetermined time period, to assess a condition of the rotating equipment.

2. The method as claimed in claim 1, wherein the reference value is updated at the beginning of every predetermined time period.

3. The method as claimed in claim 1, wherein the rotating equipment receives power at a variable frequency which is used in calculation of the reference value at the beginning of each predetermined time period.

4. The method as claimed in claim 1, wherein the condition of the rotating equipment is determined based on the processed information associated with the plurality of predetermined time interval and the processed information associated with the predetermined time period.

5. The method as claimed in claim 1, wherein the operating status of the rotating equipment comprises information on one or more start of the rotating equipment and one or more stop of the rotating equipment at the plurality of predetermined time interval.

6. The method as claimed in claim 5, wherein the operating status of the rotating equipment is identified to be at the one or more stop upon detecting absence of vibration in the rotating equipment.

7. A condition monitoring device for monitoring a rotating equipment, the condition monitoring device comprising:
a plurality of sensors configured to:
at beginning of a predetermined time period, measure data of the rotating equipment; and
at every predetermined time interval,
one or more sensor of the plurality of sensors configured to generate a signal associated with vibration at a measurement location relative to the rotating equipment; and
acquire a predefined number of samples associated with the vibration at a first frequency;
a network interface configured to communicate with a server;

a processor, wherein the processor in the predetermined time period, after every predetermined time interval is configured to:

detect presence of vibration in the rotating equipment based on the generated signal;

calculate a Root Mean Square (MS) value of vibration using the acquired predefined number of samples;

compare the calculated RMS value with a reference value for detecting an operating status of the rotating equipment, wherein the reference value is calculated based on the data measured by the plurality of sensors at a beginning of every predetermined time period and is based on vibration data measured at the beginning of every predetermined time period;

store the operating status of the rotating equipment for a plurality of predetermined time interval based on the comparison;

process information stored for the plurality of predetermined time intervals in the predetermined time period, to assess a condition of the rotating equipment; and a memory communicatively coupled to the processor.

8. The condition monitoring device as claimed in claim 7, wherein the condition of the rotating equipment is determined based on the processed information associated with the plurality of predetermined time interval and the processed information associated with the predetermined time period.

9. The condition monitoring device as claimed in claim 7, wherein the operating status of the rotating equipment comprises information on one or more start of the rotating equipment and one or more stop of the rotating equipment at the plurality of predetermined time interval.

10. The condition monitoring device as claimed in claim 7 further comprises:

providing data measured by each of the plurality of sensors to the server; and receiving the information for assessing the condition of the rotating equipment, wherein the information is processed at the server based on the provided data.

* * * * *